(12) United States Patent
Carlson et al.

(10) Patent No.: US 7,945,798 B2
(45) Date of Patent: May 17, 2011

(54) BATTERY PACK FOR PORTABLE COMPUTER

(75) Inventors: Jeremy Robert Carlson, Cary, NC (US); Daryl Carvis Cromer, Cary, NC (US); Philip John Jakes, Durham, NC (US); Howard Jeffrey Locker, Cary, NC (US); James Stephen Rutledge, Durham, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 895 days.

(21) Appl. No.: 11/866,528

(22) Filed: Oct. 3, 2007

(65) Prior Publication Data
US 2009/0094465 A1    Apr. 9, 2009

(51) Int. Cl.
*G06F 1/00* (2006.01)
(52) U.S. Cl. ....................................... 713/340; 713/324
(58) Field of Classification Search ................. 713/324, 713/340
See application file for complete search history.

(56) References Cited

U.S. PATENT DOCUMENTS

| 5,300,874 | A | * | 4/1994 | Shimamoto et al. | 320/106 |
| 5,436,513 | A | * | 7/1995 | Kaye et al. | 307/71 |
| 5,689,412 | A | * | 11/1997 | Chen | 363/125 |
| 5,729,478 | A | * | 3/1998 | Ma et al. | 361/679.41 |
| 5,784,626 | A | * | 7/1998 | Odaohara | 713/300 |
| 6,157,166 | A | * | 12/2000 | Odaohhara et al. | 320/121 |
| 6,233,141 | B1 | | 5/2001 | Lee et al. | |
| 6,920,575 | B2 | * | 7/2005 | Odaohara | 713/340 |
| 7,024,574 | B2 | * | 4/2006 | Odaohhara et al. | 713/324 |

* cited by examiner

*Primary Examiner* — Chun Cao
(74) *Attorney, Agent, or Firm* — John L. Rogitz

(57) ABSTRACT

A first battery assembly is in a first battery housing that is mechanically engageable with a portable computer, and a second battery assembly is in a second battery housing that is mechanically couplable to the first battery housing. A switch has a first configuration in which communication is established between the portable computer and the first battery assembly and a second configuration in which communication is established between the portable computer and the second battery assembly.

14 Claims, 2 Drawing Sheets

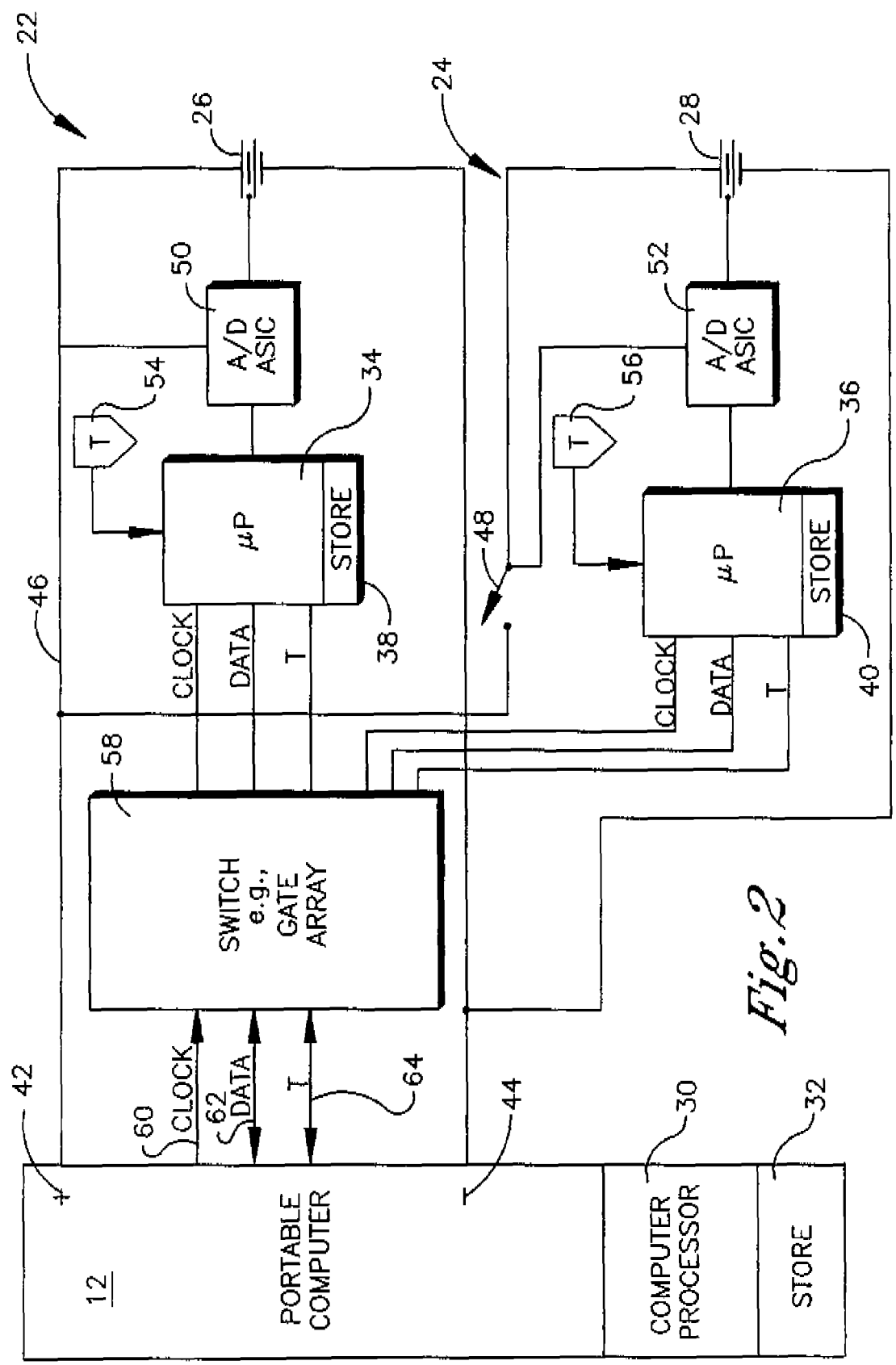

BATTERY PACK FOR PORTABLE COMPUTER

FIELD OF THE INVENTION

The present invention relates generally to battery packs for portable computers.

BACKGROUND OF THE INVENTION

Portable computers typically can be powered from the public power grid using an ac-to-dc converter. They can also be powered by rechargeable batteries, so that if a power grid outlet is not nearby or the adapter is unavailable, the computer can still be used.

The batteries can be recharged from the ac power grid either by removing the battery housing from the computer and placing it in a charge receptacle, or during use of the computer when the computer is plugged into the ac power grid. However, if the public power grid is not available and the battery discharges, the user must remove the battery and replace it with another, fresh battery if he desires to continue to use the computer. As recognize herein, swapping batteries in this way requires a complete shutdown of the computer and subsequent boot on the new battery, which is inconvenient.

SUMMARY OF THE INVENTION

A battery pack for a portable computer includes a first battery assembly in a first battery housing that is mechanically engageable with the portable computer. A second battery assembly in a second battery housing is also provided, with the second battery housing being mechanically couplable to the first battery housing. A switch has a first configuration, in which communication is established between the portable computer and the first battery assembly, and a second configuration, in which communication is established between the portable computer and the second battery assembly. The switch may be in the first battery housing.

The first battery assembly can be identical in configuration to the second battery assembly, or it may not be identical in configuration to the second battery assembly.

The first battery assembly can include a first battery, a first power line switch connected to the first battery, and a first battery processor controlling the first power line switch. Likewise, the second battery assembly can include a second battery, a second power line switch connected to the second battery, and a second battery processor controlling the second power line switch. The computer causes the processors to control their respective power switches so that only one of the batteries at a time is connected to the computer.

The data switch can communicate a data signal, a clock signal, and a temperature signal between the computer and a computer-selected one of the battery processors.

In another aspect, a computer assembly includes a portable computer, a first battery housing mechanically engageable with the portable computer, and a second battery housing mechanically engageable with the first battery housing. The first battery housing holds a first battery assembly including a first battery and the second battery housing holds a second battery assembly including a second battery. During a first period the portable computer controls the first battery assembly to supply power to the portable computer and during a second period the portable computer controls the second battery assembly to supply power to the portable computer. With this arrangement, during the first period a second battery associated with the second battery assembly can be recharged while a first battery associated with the first battery assembly provides power to the computer.

In yet another aspect, a computer readable medium is executable by a processor for executing logic that includes determining which one of at least first and second batteries to use to power a portable computer, and controlling a switch to communicate with a processor associated with the one of the at least first and second batteries that has been determined to be used to power the portable computer.

The details of the present invention, both as to its structure and operation, can best be understood in reference to the accompanying drawings, in which like reference numerals refer to like parts, and in which:

BRIEF DESCRIPTION OF THE DRAWINGS

FIG. 2 is a block diagram of the battery assemblies in a non-limiting embodiment, showing the assemblies electrically connected together as they would be when their respective housings are mechanically coupled together.

DETAILED DESCRIPTION OF THE PREFERRED EMBODIMENT

Figure 1:
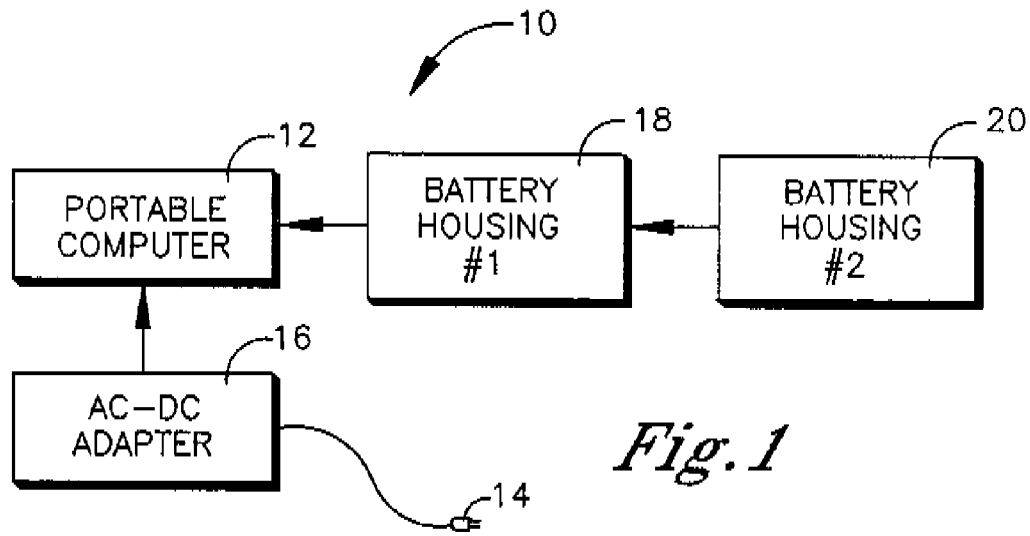
FIG. 1 is a block diagram of a non-limiting system in accordance with the present invention, showing the computer with ac-dc adapter and showing the first and second battery housings in an exploded relationship.

Referring initially to FIG. 1, a system is shown, generally designated 10, which includes a portable computer 12 such as a notebook computer that can be powered through an ac power grid plug 14 and ac adapter 16 which provides dc power to the computer 12. The computer 12 may also be powered by at least first and second battery assemblies, described further below, that are held in respective battery housings 18, 20. The first battery housing 18 is mechanically engageable with the portable computer 12 and when properly engaged can exchange data and power with computer 12. The second battery housing 20 is mechanically couplable to the first battery housing 18 using, e.g., the same type of mechanical and electrical connections that are used to engage the first battery housing 18 with the computer 12. Or, a different type of mechanical or electrical connection may be used.

FIG. 2 shows non-limiting implementations of first and second battery assemblies 22, 24 that are respectively held in the battery housings 18, 20. It is to be understood that in addition to the components shown in FIG. 2 and discussed below, each battery assembly may include additional components, such as thermal safety components, that are not central to present principles. While FIG. 2 shows that the assemblies 22, 24 are substantially identical to each other in configuration, they need not be identical in some embodiments. As an example, in one embodiment both assemblies 22, 24 include respective batteries 26, 28 that are Lithium-ion batteries, but in other implementations one battery may be a Lithium-ion battery and the other may be, e.g., a fuel cell.

Turning to the details of FIG. 2, the computer 12 typically includes one or more computer processors 30 that can access one or more computer readable storage media 32, such as solid state memory (e.g., random access memory (RAM), read-only memory (ROM), flash memory, etc.) and/or disk-based memory or other types of memory media including removable memory media. Each battery assembly 22, 24 includes a respective battery processor 34, 36, each of which may access a respective data store (computer readable medium) 38, 40. The logic herein may be executed by one or more of the processors 30, 34, 36 accessing instructions on their respective media 32, 38, 40.

As shown, the computer 12 has a positive direct current (DC) terminal 42, and when the battery housings 18, 20 are coupled together with the first battery housing 18 engaged with the computer 12, the positive terminals of the first and second batteries 26, 28 are electrically connected to the positive terminal 42 of the computer 12. Likewise, the computer 12 has a negative DC power terminal 44, and when the battery housings 18, 20 are coupled together with the first battery housing 18 engaged with the computer 12, the negative terminals of the first and second batteries 26, 28 are electrically connected to the negative terminal 42 of the computer 12.

In series between the positive terminal 42 and each positive terminal of the batteries 26, are respective power switches 46, 48 as shown. Each of the power switches 46, 48, which are operable independently of each other, can be closed to connect the positive terminal of its associated battery with the positive terminal 42 of the computer, and each power switch 46, 48 can be opened to disconnect the positive terminal of its associated battery from the positive terminal 42 of the computer. In non-limiting implementations each power switch 46, 48 may be implemented by respective dual in-line field effect transistors (FET).

In accordance with present principles, the batteries 26, 28 are logically "OR'd" together, meaning that no more than one battery 26, 28 at a time is connected to the positive terminal 42 of the computer 12. However, in some implementations both power switches 46, 48 may be closed at the same time when, e.g., one of the batteries 26, 28 is smaller than the other battery or has fewer cells than the other battery so it would charge first.

To this end and in accordance with principles set forth further below, the power switches 46, 48 are controlled by their respective battery processors 34, 36. In the non-limiting implementation shown, the battery processors 34, 36 exert control over their respective power switches 46, 48 through respective application specific integrated circuits (ASIC) 50, 52, each of which may function as an analog-to-digital (A/D) converter for, e.g., communicating signals representative of battery temperature, battery voltage, and the like to the respective battery processors 34, 36. If desired, each battery processor 34, 36 may also receive temperature signals from one or more respective temperature sensors 54, 56, which may be thermistors. Accordingly, in addition to the logic below the battery processors can control charging and discharging to stay within safety parameters including temperature and electrical parameters.

In accordance with present principles, a data switch 58, which may be implemented by a gate array, is also provided to communicate data between the computer 12 and a computer-selected one (or both, as may be needed at the moment when charging or discharging is swapped) of the battery processors 34, 36. As understood herein, using a gate array facilitates adding the present invention to existing portable devices that are not aware of the existence of two batteries. Alternative to a data switch 58, a connector may be provided on the portable computer 12 which can support two batteries by having two clock lines, two data lines, two temperature lines, etc.

In the embodiment shown the data switch 58 is located in the first battery housing 18. The data that is communicated may be along three lines in non-limiting implementations, namely, a clock line 60, a data line 62, and a temperature signal line 64. Under control of the computer 12, the data switch 58 routes signals on the lines 60, 62, 64 either to the first battery processor 34, and/or to the second battery processor 36, as needed to implement the logic of FIG. 3, in which the computer 12 causes the battery processors 34, 36 to control their respective power switches 46, 48 so that only one of the batteries 26, 28 at a time is connected to the computer 12. At least the clock and data lines 60, 62 may be the type of serial bus lines known as system management (SM) bus lines.

In other words, once the power line switches 46, 48 are configured as desired by the computer 12, subsequent data communication through the data switch 58 may be only to the one of the battery processors that is operating to charge or discharge its battery.

Figure 3:
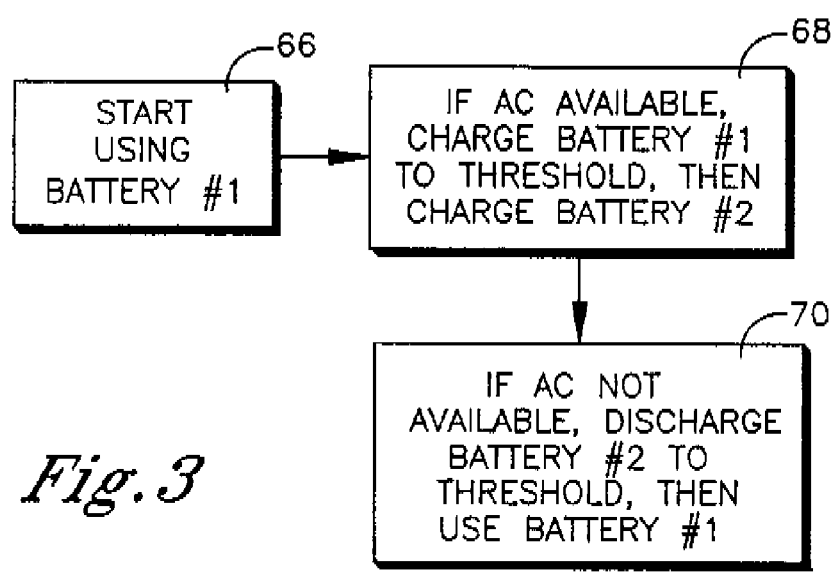
FIG. 3 is a flow chart of non-limiting logic envisioned by non-limiting embodiments of the present invention.

Non-limiting logic for implementing the present invention can be seen in FIG. 3, which is presented in flow chart format for ease of exposition, it being understood that in actual implementation the logic may be otherwise implemented, e.g., as state logic. Commencing at block 66, the first battery 26 typically initially powers (or is charged by, if AC is available) the computer 12. At block 28, it is determined whether AC is available as indicated by receiving power from the adapter 16, and if it is the computer 12 typically is powered from the adapter 16 and can charge its batteries, also using power from the adapter 16. In non-limiting implementations, the first battery 26 typically is charged first up to a threshold, e.g., up to 80% capacity. During this period, the computer 12 controls the battery processors 34, 36 to respectively close the first power switch 46 and open the second power switch 48. This switch configuration is the one shown in FIG. 2. Also during this period, once the power switches 46, 48 are configured as desired by the computer 12, data communication through the data switch 58 is only to the first battery processor 34.

Once the first battery 26 has been charged to threshold, the computer 12 controls the battery processors 34, 36 to respectively open the first power switch 46 and close the second power switch 48 to charge the second battery 28 to a threshold. During this second period, once the power switches 46, 48 are configured as desired by the computer 12, data communication through the data switch 58 is only to the second battery processor 34. Once both batteries have been charged to the thresholds, the process at block 68 can continue if desired to sequentially "top off" each battery 26, 28 in turn.

Block 70 indicates that if AC is not available, the second battery 26 is preferentially discharged first to power the computer 12. During this period, if desired the second battery housing 20 may be decoupled from the first battery housing 18 and placed in a separate charging receptacle while the first battery 26 powers the computer 12 for operation. During this period, the computer 12 controls the battery processors 34, 36 to respectively open the first power switch 46 and (when the second battery housing 20 is coupled to the first battery housing) close the second power switch 48. Also during this period, once the power switches 46, 48 are configured as desired by the computer 12, data communication through the data switch 58 is only to the second battery processor 34.

When the second battery 26 is discharged to a threshold capacity, e.g., 0%, the computer 12 controls the battery processors 34, 36 to respectively close the first power switch 46 and open the second power switch 48 to discharge the first battery 26, i.e., to power the computer 12 using the first battery 26. During this second period, once the power switches 46, 48 are configured as desired by the computer 12, data communication through the data switch 58 is only to the first battery processor 30.

Thus, during a first period the portable computer 12 controls the second battery assembly 24 to supply power to the portable computer 12 and during a second period the portable computer 12 controls the first battery assembly 22 to supply power to the portable computer 12, such that during the second period the second battery 28 can be removed from the first battery and recharged in an external charger while the first battery 26 provides power to the computer 12. In the non-limiting embodiment shown, battery operation is accomplished by controlling the data switch 58 to communicate with the battery processor 34, 36 that is associated with the selected battery 26, 28. When ac is available through the portable computer the second battery is charged first, before the first battery.

In other implementations, two second batteries may be provided. One of the second batteries can always be charged. In this implementation when the installed second battery is exhausted it is removed from the first battery and replaced with the charged second battery, with the exhausted second battery then being placed in an external charger to recharge it and render it ready for the next swap.

While the particular BATTERY PACK FOR PORTABLE COMPUTER is herein shown and described in detail, it is to be understood that the subject matter which is encompassed by the present invention is limited only by the claims.

What is claimed is:

1. A battery pack for a portable computer, comprising:
    a first battery assembly in a first battery housing, the first battery housing being mechanically engageable with the portable computer, wherein the first battery assembly includes a first battery, a first power line switch connected to the first battery, and a first battery processor controlling the first power line switch; and
    a second battery assembly in a second battery housing mechanically couplable to the first battery housing, wherein the second battery assembly includes a second battery, a second power line switch connected to the second battery, and a second battery processor controlling the second power line switch;
    wherein communication is established between the portable computer, the first battery assembly, and the second battery assembly;
    wherein the computer causes the processors to control their respective power line switches so that only one of the batteries at a time is connected to the computer.

2. The battery pack of claim 1, comprising the portable computer engaged with the first battery housing.

3. The battery pack of claim 1, wherein the first battery assembly is identical in configuration to the second battery assembly.

4. The battery pack of claim 1, wherein the first battery assembly is not identical in configuration to the second battery assembly.

5. The battery pack of claim 1, wherein the first switch and the second switch each communicate at least a data signal, a clock signal, and a temperature signal between the computer and a computer-selected one of the battery processors.

6. The battery pack of claim 1, comprising the portable computer engaged with the second battery housing.

7. A computer assembly, comprising:
    a portable computer, including a battery connector;
    a first battery housing mechanically engageable with the portable computer, the first battery housing holding a first battery assembly including a first battery;
    wherein during a first period the portable computer controls a second battery assembly including a second battery housing mechanically engageable with the first battery housing and holding a second battery assembly including a second battery to supply power to the portable computer;
    wherein during a second period the portable computer controls the first battery assembly to supply power to the portable computer, such that during the second period the second battery housing can be removed from the first battery housing and engaged with an external charger to recharge the second battery while the first battery provides power to the computer; and
    wherein the battery connector is configured to support the first and second batteries such that no switch is needed to route communication from the portable computer to select one of the battery assemblies, wherein the first battery assembly includes a first power line switch connected to the first battery and a first battery processor controlling the first power line switch, the second battery assembly includes a second power line switch connected to the second battery and a second battery processor controlling the second power line switch, and the computer causes the processors to control their respective power line switches so that only one of the batteries at a time is connected to the computer.

8. The assembly of claim 7, wherein the first battery assembly is identical in configuration to the second battery assembly.

9. The assembly of claim 7, wherein the first battery assembly is not identical in configuration to the second battery assembly.

10. The assembly of claim 7, wherein the switch communicates at least a data signal, a clock signal, and a temperature signal between the computer and a computer-selected one of the battery assemblies.

11. A method, comprising: electrically engaging a first removable rechargeable battery with a portable computer;
    mechanically coupling a second battery housing holding a second battery assembly with a first battery housing associated with the first battery assembly;
    selectively routing data communication from the computer to the first or second battery assembly;
    wherein the first battery assembly includes a first power line switch connected to the first battery, and a first battery processor controlling the first power line switch;
    wherein the second battery assembly includes a second power line switch connected to the second battery, and a second battery processor controlling the second power line switch; and
    wherein the computer causes the processors to control their respective power line switches so that only one of the batteries at a time is electrically connected to the computer.

12. The method of claim 11, wherein the first battery assembly is identical in configuration to the second battery assembly.

13. The method of claim 11, wherein the first battery assembly is not identical in configuration to the second battery assembly.

14. The method of claim 11, wherein the data communication includes at least a data signal, a clock signal, and a temperature signal between the computer and a computer-selected one of the battery processors.

* * * * *